(12) United States Patent
Li et al.

(10) Patent No.: US 10,488,880 B2
(45) Date of Patent: Nov. 26, 2019

(54) CONTROL METHOD FOR IMPROVING CONVERSION EFFICIENCY OF A MULTI-CHANNEL MPPT INVERTER

(71) Applicant: SMA Solar Technology AG, Niestetal (DE)

(72) Inventors: Xiaolong Li, Suzhou (CN); Xiaojun Liao, Suzhou (CN); Chengwei Shu, Suzhou (CN); Jin Cheng, Suzhou (CN); Xiaojie Cai, Suzhou (CN); Jiayu Yao, Suzhou (CN)

(73) Assignee: SMA Solar Technology AG, Niestetal (DE)

( * ) Notice: Subject to any disclaimer, the term of this patent is extended or adjusted under 35 U.S.C. 154(b) by 0 days.

(21) Appl. No.: 16/244,429

(22) Filed: Jan. 10, 2019

(65) Prior Publication Data

US 2019/0146540 A1 May 16, 2019

Related U.S. Application Data

(63) Continuation of application No. PCT/EP2017/066206, filed on Jun. 29, 2017.

(30) Foreign Application Priority Data

Jul. 12, 2016 (CN) .......................... 2016 1 0545620

(51) Int. Cl.
*H02M 1/36* (2007.01)
*G05F 1/67* (2006.01)
*H02M 3/158* (2006.01)
*H02J 1/10* (2006.01)
(Continued)

(52) U.S. Cl.
CPC ................ *G05F 1/67* (2013.01); *H02J 1/102* (2013.01); *H02J 3/385* (2013.01); *H02M 1/36* (2013.01); *H02M 3/1584* (2013.01); *H02J 2001/106* (2013.01); *H02M 2001/007* (2013.01); *Y02E 10/58* (2013.01)

(58) Field of Classification Search
CPC ........ H02M 1/36; H02M 3/142; H02M 3/158; H02M 3/1584; H02M 2003/1586; H02M 2007/4822; H02M 7/493; H02M 2001/0067; H02M 2001/007; G05F 1/67; H02J 1/102; H02J 3/385; H02J 2001/106; Y02E 10/58
USPC .................... 323/266, 272, 901, 906; 363/71
See application file for complete search history.

(56) References Cited

U.S. PATENT DOCUMENTS

2012/0043818 A1* 2/2012 Stratakos ................ H02J 3/383
307/77
2012/0134186 A1* 5/2012 Johnson .................. H02J 3/385
363/71
(Continued)

FOREIGN PATENT DOCUMENTS

WO 2012157329 A1 11/2012

OTHER PUBLICATIONS

International Search Report dated Oct. 20, 2017 in connection with International Application PCT/EP2017066206.

*Primary Examiner* — Alex Torres-Rivera
(74) *Attorney, Agent, or Firm* — Eschweiler & Potasknik, LLC

(57) ABSTRACT

The present disclosure provides a control method for improving conversion efficiency of a multi-channel MPPT input inverter, which implements high efficient operation of the inverter.

6 Claims, 3 Drawing Sheets

(51) Int. Cl.
*H02J 3/38* (2006.01)
*H02M 1/00* (2006.01)

(56) References Cited

U.S. PATENT DOCUMENTS

| | | | |
|---|---|---|---|
| 2012/0206118 A1* | 8/2012 | Williams | H02J 3/385 323/282 |
| 2012/0248880 A1* | 10/2012 | Alonso | G05F 1/67 307/82 |
| 2012/0319489 A1* | 12/2012 | McCaslin | H02J 1/10 307/77 |
| 2014/0252862 A1* | 9/2014 | Cheng | H02J 3/385 307/82 |
| 2016/0261118 A1 | 9/2016 | Scaletti | |
| 2017/0264099 A1 | 9/2017 | Zhang | |

* cited by examiner

CONTROL METHOD FOR IMPROVING CONVERSION EFFICIENCY OF A MULTI-CHANNEL MPPT INVERTER

CROSS REFERENCE TO RELATED APPLICATIONS

This application is a continuation of International Patent Application number PCT/EP2017/066206, filed on Jun. 29, 2017, which claims priority to Chinese Patent Application number 201610545620.2, filed on Jul. 12, 2016, and is hereby incorporated by reference in its entirety.

FIELD

The present disclosure relates to a control method of a multi-channel MPPT inverter, and more particularly, to a control method for improving conversion efficiency of a multi-channel MPPT inverter.

BACKGROUND

A photovoltaic power generation system is usually composed of three parts: a photovoltaic panel array, a direct-current boost converter and a grid-connected power converter. The direct-current boost converter and the grid-connected power converter are interconnected and isolated by an intermediate direct-current bus, and are usually as a whole, called a photovoltaic inverter. The main working principle is that the direct-current boost converter boosts low-voltage direct current output by the photovoltaic panel array to high-voltage stable direct current for converting into alternating current by the back stage grid-connected power converter and then feeding into the power grid. With the increase in grid-connected power of photovoltaic power generation systems and the dropping of the maximum power point (MPP) of photovoltaic panels (PVs), single-channel direct-current boost circuits are difficult to take account of application scenarios of both high power and high boost ratio. Thus use of a multi-channel MPPT input to improve grid-connected power generation of photovoltaic inverters is a research hotspot of various manufacturers.

Without loss of generality, using the more applied dual-channel MPPT input photovoltaic inverter as an example, the existing multi-channel MPPT control logic is described. FIG. 1 shows a structural diagram of a dual-channel PV input photovoltaic inverter system 10 comprising photovoltaic panels PV1, PV2, input capacitors C1, C2, input boost circuit boost1 12, boost2 14, a direct-current bus capacitor Cdo, an H-bridge inverter 16 and a controller DSC 18. Outputs of the boost circuit boost1 12 and boost2 14 are connected to a common direct-current bus 20, and power is fed into the power grid 22 through the bus capacitor Cdo and the H-bridge inverter 16. PWM1 and PWM2 are drive signals of the boost circuits boost1 12 and boost2 14, respectively. The controller DSC 18 generally implements dual-channel MPPT control using a digital signal processor (DSP) by acquisition of information of PV input voltages $v_{PV1}$ and $v_{PV2}$ in two channels, PV input currents $i_{PV1}$ and $i_{PV2}$ in the two channels and a direct-current bus voltage $v_{bus}$, a brief control flow chart 40 is shown in FIG. 2. In FIG. 2, $v_{PV1}{}^*$, $v_{PV2}{}^*$ and $v_{bus}{}^*$ are reference signals of the PV voltages in the two channels and direct-current bus voltage, respectively, $\Delta v_{PV}$ is the difference between the PV voltages in the two channels, $\Delta v_{PV} = v_{PV1} - v_{PV2}$; $V_{TH}$ is a judging threshold of the difference between the PV voltages in the two channels. The controller DSC obtains PV input power signals $P_{PV1}$ and $P_{PV2}$ in the two channels by sampling the PV input voltages $v_{PV1}$, and $v_{PV2}$ in the two channels at 44 and the PV input currents $i_{PV1}$ and $i_{PV2}$ in the two channels at 42, and obtains the PV voltage reference signals $v_{PV1}{}^*$ and $v_{PV2}{}^*$ through their respective MPPT module operation. At the same time, the controller DSC calculates the difference $\Delta v_{PV}$ between the PV voltages in the two channels at 46, and substitutes it into a boost start and stop control logic to compare with the preset threshold $V_{TH}$. There are three cases:

$\Delta v_{PV} \geq V_{TH}$ (Y at 48), the controller DSC turns off a boost1 controller, blocks the drive signal PWM1 of the boost1 circuit, turns off the boost1 circuit at 50, enables a boost2 controller and obtains the drive signal PWM2 of the boost2 circuit, and the direct-current bus voltage reference signal $v_{bus}{}^* = v_{PV1}{}^*$ at 52.

$\Delta v_{PV} \leq V_{TH}$ (Y at 54), the controller DSC turns off the boost2 controller, blocks the drive signal PWM2 of the boost2 circuit, turns off the boost2 circuit at 56, enables the boost2 controller and obtains the drive signal PWM1 of the boost1 circuit, and the direct-current bus voltage reference signal $v_{bus}{}^* = v_{PV2}{}^*$ at 58.

$V_{TH} \geq \Delta v_{PV} \geq -V_{TH}$, (N at 54) the controller DSC enables both the boost1 and boost2 controllers and obtains the drive signals PWM1 and PWM2 of the boost1 and boost2 circuits at 60, and the direct-current bus voltage reference signal $v_{bus}{}^*$ uses the maximum of the two PV voltage reference signals, i.e., $v_{bus}{}^* = \max(v_{PV1}{}^*, v_{PV2}{}^*)$ at 62

In the practical application, comprehensively considering thermal balance of a direct-current boost circuit of the inverter, conversion efficiency of the whole inverter and the service life of components, for the multi-channel MPPT input inverter, photovoltaic panels in all channels are usually configured almost uniformly, thus a PV curve of each input of the inverter is approximately the same. It can be seen from FIG. 2, using the existing multi-channel MPPT control method, each boost circuit is in a working state at a steady operating point, the conversion efficiency of the inverter is low, and the grid-connected power generation is small.

SUMMARY

An object of the present disclosure is to solve shortcomings and problems existing in the prior art, and propose a control method which can improve conversion efficiency of a multi-channel MPPT input inverter. By constructing a new boost start and stop control logic and virtual local maximum power point (VLMPP), a voltage difference between input PV voltages in multiple channels and the VLMPP is detected in real time and processed according to a certain logical relationship, and then turn-off and turn-on of a PV input boost circuit in each channel is controlled, to implement high efficient operation of the invertor.

The technical scheme adopted by the present disclosure according to one embodiment is as follows.

A control method for improving conversion efficiency of a multi-channel MPPT inverter comprises at act S1: collecting an input voltage $v_{PVm}$ of a photovoltaic panel in each channel, an input current $i_{PVm}$ of the photovoltaic panel in each channel and a direct-current bus voltage $v_{bus}$, obtaining an input power $P_{PVm}$ of the photovoltaic panel in each channel, and using input voltages of at least two channels to obtain a voltage difference $\Delta v_{PV}$, wherein m=1, 2, . . . , M, M is a number of input channels of the photovoltaic inverter MPPT. At act S2, the method comprises comparing the voltage difference $\Delta v_{PV}$ with a preset on-off control judging threshold to obtain a start and stop state of a boost circuit in each channel, a voltage reference signal $v_{PVm}^*$ in each channel and a direct-current bus voltage reference signal $v_{bus}^*$. The boost start and stop state is determined as follows: at act S21, when $|\Delta v_{PV}| \geq V_{THb}$, turning off a boost circuit in a channel corresponding to a maximum input voltage $v_{PV\_max}$, activating boost circuits in the remaining channels, wherein $V_{THb}$ is a boost on-off control judging threshold 1, and maximizing the input power $P_{PVm}$ by an MPPT module in each channel to obtain the voltage reference signal $v_{PVm}^*$ in each channel, the direct-current bus voltage reference signal $v_{bus}^*$ using a maximum voltage reference signal $v_{PV\_max}^*$. At act S22, when $V_{THb} \geq |\Delta v_{PV}| \geq V_{THs}$, activating all boost circuits, wherein $V_{THs}$ is a boost on-off control judging threshold 2, and $V_{THs} < V_{THb}$; and maximizing the input power $v_{PVm}$ by the MPPT module in each channel to obtain the voltage reference signal $v_{PVm}^*$ in each channel, the direct-current bus voltage reference signal $v_{bus}^*$ using the maximum voltage reference signal $v_{PV\_max}^*$. At act S23, when $V_{THs} \geq |\Delta v_{PV}| \geq 0$, when the act is performed for a first time, obtaining a voltage $V_{VLMPP}$ at a virtual local maximum power point (VLMPP), turning off all the boost circuits, maximizing a total input power $P_{PV\_sum}$ of the inverter by an MPPT module based on the direct-current bus voltage $v_{bus}$ to obtain the direct-current bus voltage reference signal $v_{bus}^*$, monitoring a voltage difference between the direct-current bus voltage $v_{bus}$ and $V_{VLMPP}$, and activating all the boost circuits when the voltage difference exceeds $V_{THb}$.

In one embodiment, at act S1, using the maximum input voltage $v_{PV\_max}$, a PV input voltage $v_{PV\_Smax}$ slightly less than $v_{PV\_max}$ and a minimum PV input voltage $v_{PV\_min}$ to obtain a voltage difference $\Delta v_{PV\_max}$ between $v_{PV\_max}$ and $v_{P\_min}$ and a voltage difference $\Delta v_{PV\_MS}$ between $v_{PV\_max}$ and $v_{PV\_Smax}$. At act S2, comparing the voltage differences $\Delta v_{PV\_max}$ and $\Delta v_{PV\_MS}$ with the preset on-off control judging threshold to obtain the start and stop state of the boost circuit in each channel. The boost start and stop state is determined as follows: at act S21, $\Delta v_{PV}| \geq V_{THb}$, turning off the boost circuit in the channel corresponding to the maximum input voltage $v_{PV\_max}$, and activating the boost circuits in remaining channels. At act S22, $V_{THb} \geq |\Delta v_{PV}| \geq V_{THs}$, activating all the boost circuits. At act S23, $V_{THs} \geq |\Delta v_{PV}| \geq 0$, when the step is performed for the first time, obtaining the voltage $V_{VLMPP}$ at the VLMPP point, turning off all the boost circuits, monitoring the voltage difference between $v_{bus}$ and $V_{VLMPP}$, and activating all the boost circuits when the voltage difference exceeds $V_{THb}$.

In one embodiment, act S23 further comprises: at act S231, when $V_{THb} \geq |v_{bus} - V_{VLMPP}| \geq 0$, turning off all the boost circuits, and maximizing the total input power $P_{PV\_sum}$ of the inverter by the MPPT module based on $v_{bus}$ to obtain the direct-current bus voltage reference signal $v_{bus}^*$. At act S232, when $V_{THb} \geq |v_{bus} - V_{VLMPP}| \geq 0$, activating all the boost circuits, and maximizing the input power $P_{PVm}$ by the MPPT module in each channel to obtain the voltage reference signal in each channel, the direct-current bus voltage reference signal $v_{bus}^*$ using the maximum voltage reference signal $v_{PV\_max}^*$.

In one embodiment, at act S23, the voltage $V_{VLMPP}$ at the VLMPP point is obtained by following formula:

$$V_{VLMPP} = \frac{SUM(v_{PV1}, v_{PV2}, \ldots, v_{PVM})}{M}.$$

In one embodiment, at act S1, at least use a voltage difference between the maximum input voltage and the minimum input voltage of all input channels.

In one embodiment, at act S1, use the maximum input voltage and the minimum input voltage to obtain the voltage difference of all input channels.

In one embodiment, the following acts comprise: at act S1, a controller DSC collecting a PV input voltage $v_{PVm}$ in each channel, a PV input current $i_{PVm}$ in each channel and a direct-current bus voltage $v_{bus}$, calculating and obtaining an input power $P_{PVm}$ in each channel and a total input power $P_{PV\_sum}$ of an inverter, calculating and obtaining a maximum PV input voltage $v_{PV\_max}$, a PV input voltage $v_{PV\_Smax}$ slightly less than $v_{PV\_max}$ and a minimum PV input voltage $v_{PV\_min}$, and calculating and obtaining a voltage difference $\Delta v_{PV\_max}$ between $v_{PV\_max}$ and $v_{PV\_min}$ and a voltage difference $\Delta v_{PV\_MS}$ between $v_{PV\_max}$ and $v_{PV\_Smax}$; wherein m=1, 2, . . . , M, M is the number of input channels of the photovoltaic inverter MPPT, $\Delta v_{PV\_max} = v_{PV\_max} - v_{PV\_min}$, and $\Delta v_{PV\_MS} = v_{PV\_max} - v_{PV\_Smax}$. At act S2, comparing the voltage differences $\Delta v_{PV\_max}$ and $\Delta v_{PV\_MS}$ to obtain a start and stop state of a boost circuit in each channel, a PV voltage reference signal $v_{PVm}^*$ in each channel and a direct-current bus voltage reference signal $v_{bus}^*$, specifically comprising: at act S21, when $|\Delta v_{PV\_MS}| \geq V_{THb}$, the controller DSC turning off a boost controller in a channel with the maximum PV input voltage $v_{PV\_max}$, blocking a drive signal in the channel, turning off the boost circuit in the channel, enabling boost controllers in remaining channels and obtaining drive signals PWMm in the channels, and at a same time the controller DSC maximizing an input power $P_{PVm}$ by an MPPT module in each channel to obtain a PV voltage reference signal $v_{PVm}^*$ in each channel, the direct-current bus voltage reference signal using the maximum PV input voltage reference signal $v_{PV\_max}^*$, i.e., $v_{bus}^* = v_{PV\_max}^*$, and wherein $V_{THb}$ in the formula is a boost on-off control judging threshold 1. At act S22, when $V_{THb} \geq |\Delta v_{PV\_MS}| \geq V_{THs}$, the controller DSC enabling the boost controller in each channel and obtaining the drive signal PWMM of the boost circuit in each channel, and at the same time the controller DSC substituting the input power $P_{PVm}$ in each channel into the MPPT module in each channel to obtain the PV voltage reference signal $v_{PVm}^*$ in each channel, the direct-current bus voltage reference signal $v_{bus}^*$ using the maximum value $v_{PV\_max}^*$ of PV voltage reference signals, i.e., $v_{bus}^* = v_{PV\_max}^*$, and wherein $V_{THs}$ in the formula is a boost on-off control judging threshold 2, wherein $V_{THs} < V_{THb}$. At act S23: when $V_{THs} \geq |\Delta v_{PV\_max}| \geq 0$, the controller DSC constructing VLMPP point voltage information, turning off all the boost circuits, blocking the drive signal PWMm of the boost circuit in each channel, maximizing a total input power $P_{PV\_sum}$ of the inverter by an MPPT module based on $v_{bus}$ to obtain the direct-current bus voltage reference signal $v_{bus}^*$.

At act S23, the controller DSC monitoring a voltage difference between $v_{bus}$ and $V_{VLMPP}$ in real time, when the voltage difference between $v_{bus}$ and $V_{VLMPP}$ exceeds $V_{THb}$, activates the boost controller in each channel mandatorily and starting all the boost circuits; at the same time the controller DSC maximizes the input power $P_{PVm}$ by the MPPT module in each channel to obtain the PV voltage reference signal $v_{PVm}^*$ in each channel, the DC bus voltage reference signal $v_{bus}^*$ using a maximum value $v_{PV\_max}^*$ of PV voltage reference signals, i.e., $v_{bus}^* = v_{PV\_max}^*$; wherein if M=2, that is, in a two-channel MPPT inverter, the PV input voltage $v_{PV\_Smax}$ slightly less than $v_{PV\_max}$ and the minimum PV input voltage $V_{PV\_min}$ are the same value, $\Delta v_{PV\_max}=\Delta v_{V\_MS}$.

Compared to the prior art, the present disclosure has the following advantages using the scheme described above: a new boost start and stop control logic and a virtual local maximum power point (VLMPP) are constructed, a voltage difference between input PV voltages in multiple channels and the VLMPP is detected in real time and processed according to a certain logical relationship, and then turn-off and turn-on of a PV input boost circuit in each channel is controlled, thereby reducing the power loss in a steady state of the inverter, improving the conversion efficiency of the inverter, and implementing the economic and efficient operation of the inverter.

DETAILED DESCRIPTION

Various embodiments of the present disclosure will be described in detail in conjunction with the accompanying drawings so that advantages and features of the present disclosure will be more readily understood by those skilled in the art.

Without loss of generality, using the more applied dual-channel MPPT input photovoltaic inverter as an example, a multi-channel MPPT control logic and control method according to the present invent are described.

Figure 1:
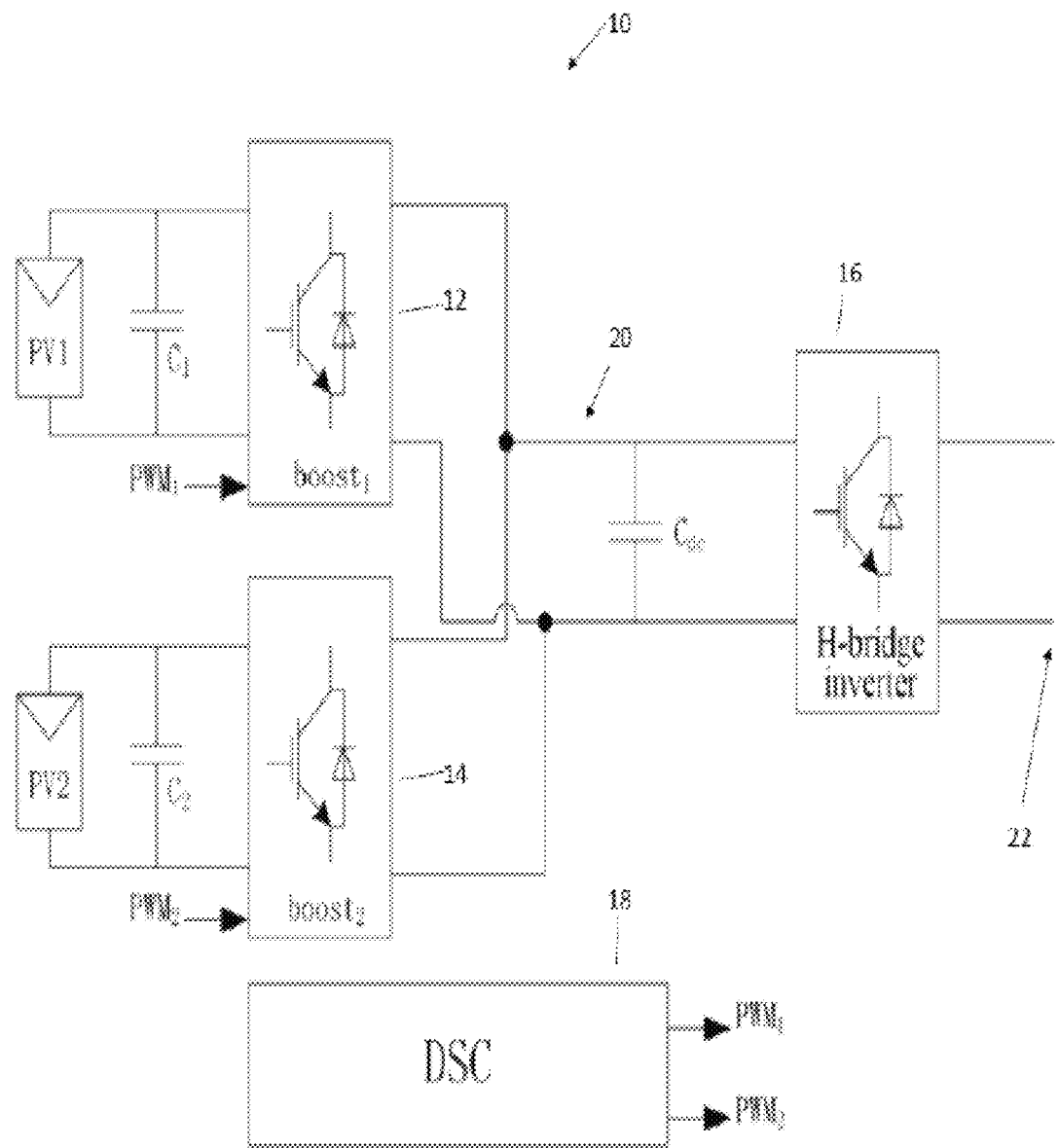
FIG. 1 is a structural diagram of a control system of a dual-channel MPPT photovoltaic inverter.

A hardware circuit used by the present disclosure as shown in FIG. 1 may be employed, and comprises photovoltaic panels PV1, PV2, input capacitors C1, C2, input boost circuit boost1 12, boost2 14, a direct-current bus capacitor Cdo, an H-bridge inverter 16 and a controller DSC 18. Outputs of the boost circuit boost1 12 and boost2 14 are connected to a common direct-current bus 20, and power is fed into the power grid 22 through the bus capacitor Cdo and the H-bridge inverter 16. PWM1 and PWM2 are drive signals of the boost circuits boost1 12 and boost2 14, respectively. A digital signal processor (DSP) is adopted in one embodiment to implement the controller DSC by corresponding hardware signal processing and acquisition of information of PV input voltages $v_{PV1}$ and $v_{PV2}$ in two channels, PV input currents $i_{PV1}$ and $i_{PV2}$ in the two channels and a direct-current bus voltage $v_{bus}$.

Figure 2:
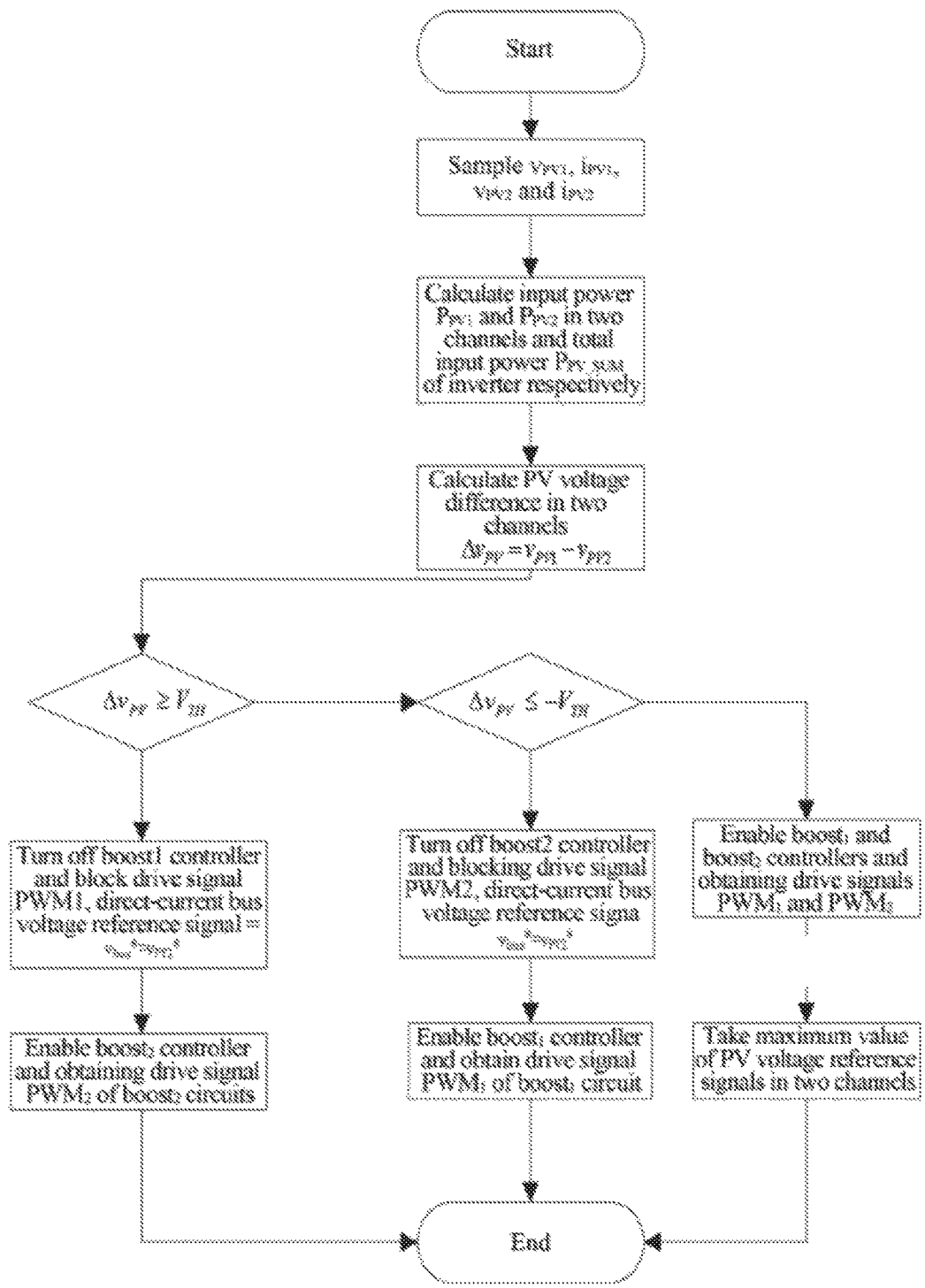
FIG. 2 is a control flow chart of a dual-channel MPPT photovoltaic inverter in prior art.

Compared with the existing two-channel MPPT control method 40 of FIG. 2, the control method according to the present disclosure redesigns a start and stop control logic of the dual-channel PV input boost circuit, and constructs a virtual local maximum power point (VLMMP) for judgment in restart of the double-channel boost circuit. Using the control method according to the present disclosure, the power loss in a steady state of the inverter can be reduced, the conversion efficiency of the inverter is improved, and the economic operation of the inverter is implemented.

Figure 3:
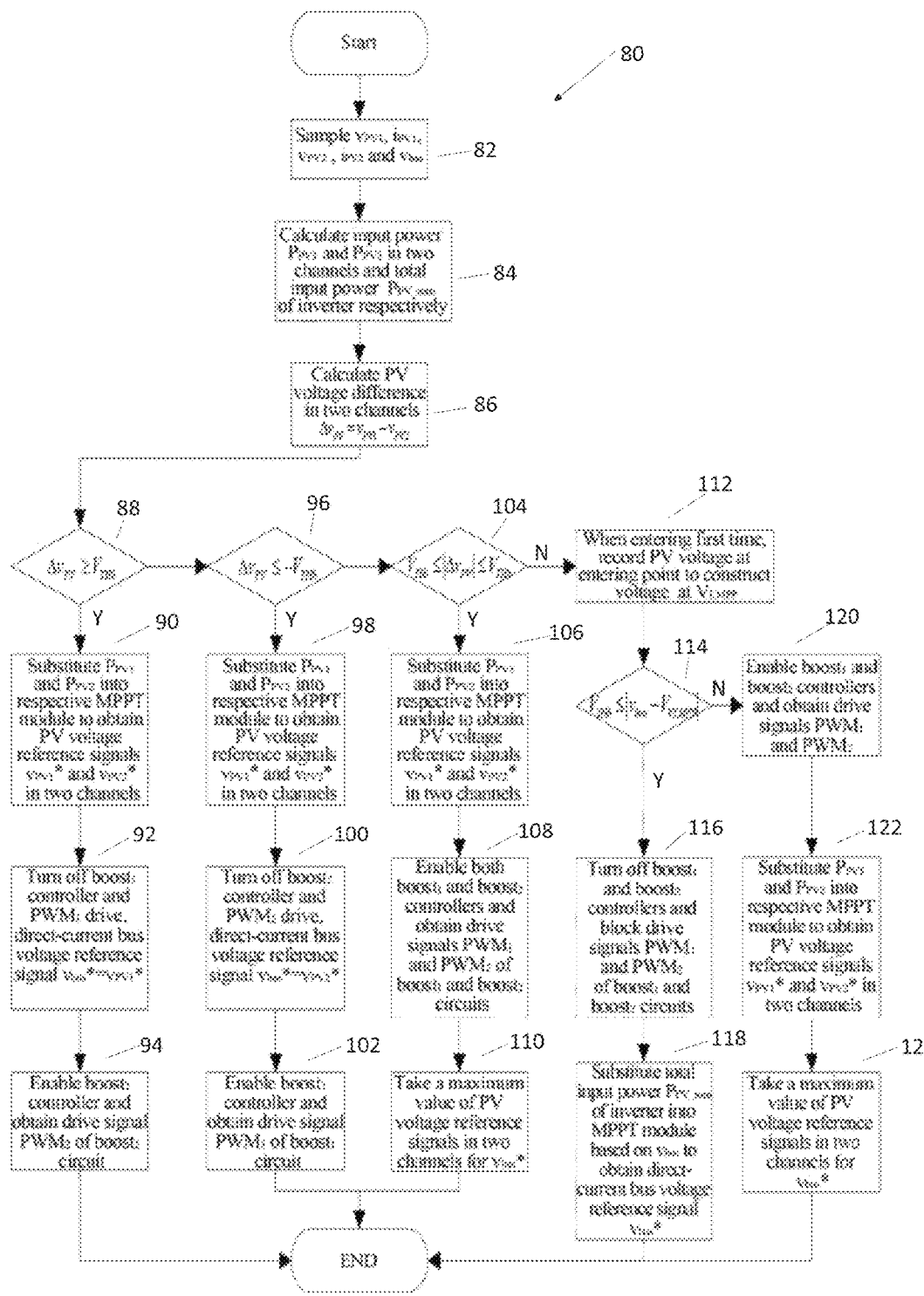
FIG. 3 is a control flow chart of a dual-channel MPPT photovoltaic inverter according to the present disclosure.

The control method 80 according to the present disclosure as shown in FIG. 3 comprises various acts. At act S1, a controller DSC collecting and obtaining information of PV input voltages $v_{PV1}$ and $v_{PV2}$ in two channels, PV input current $i_{PV1}$ and $i_{PV2}$ in the two channels and a direct-current bus voltage $v_{bus}$ at 82; a PV1 input power $P_{PV1}$, a PV2 input power $P_{PV2}$ and a total input power $P_{PV\_sum}$ of the inverter are calculated and obtained at 84, while a voltage difference $\Delta v_{PV}$ between the two PV input voltages is obtained at 86, and the expressions are as below:

$$P_{PV1}=v_{PV1}*i_{PV1} \qquad \text{I}$$

$$P_{PV2}=v_{PV2}*i_{PV2} \qquad \text{II}$$

$$P_{PV\_sum}=P_{PV1}+P_{PV1} \qquad \text{III}$$

$$\Delta v_{PV}=v_{PV1}-v_{PV2} \qquad \text{IV}$$

At act S2, voltage differences $\Delta v_{PV\_max}$ and $\Delta v_{PV\_MS}$ are compared to obtain a start and stop state of a boost circuit in each channel, a PV voltage reference signal $v_{PVm}^*$ in each channel and a direct-current bus voltage reference signal $v_{bus}^*$, which specifically comprises: at act S21, when $\Delta v_{PV} \geq V_{THb}$ (Y at 88), the controller DSC turns off a boost1 controller, blocks a drive signal PWM1 of the boost1 circuit, turns off the boost1 circuit at 92, enables a boost2 controller and obtains a drive signal PWM2 of the boost2 circuit at 94, and at the same time the controller DSC maximizes the PV1 input power $P_{PV1}$ and the PV2 input power $P_{PV2}$ by an MPPT modules to obtain PV voltage reference signals $v_{PV1}^*$ and $v_{PV2}^*$ in the two channels at 90, a direct-current bus voltage reference signal $v_{bus}^*$ is given by the PV1 input voltage reference signal, i.e., $v_{bus}^*=v_{PV1}^*$. When $\Delta v_{PV} \leq -V_{THb}$ (Y at 96), the controller DSC turns off the boost2 controller, blocks the drive signal PWM2 of the boost2 circuit, turns off the boost2 circuit at 100, enables the boost1 controller and obtaining the drive signal PWM1 of the boost1 circuit at 102, and at the same time the controller DSC maximizes the PV1 input power $P_{PV1}$ and the PV2 input power $P_{PV2}$ by the MPPT modules to obtain PV voltage reference signals $v_{PV1}^*$ and $v_{PV2}^*$ in the two channels at 98, the direct-current bus voltage reference signal $v_{bus}^*$ is given by the PV2 input voltage reference signal, i.e., $v_{bus}^*=v_{PV2}^*$. At act S22, when $V_{THb} \geq |\Delta v_{PV\_MS}| \geq V_{THs}$ (Y at 104), the controller DSC enables both the boost1 and boost2 controllers and obtains the drive signals PWM1 and PWM2 of the boost1 and boost2 circuits at 108, and at the same time the controller DSC maximizing the PV1 input power $P_{PV1}$ and the PV2 input power $P_{PV2}$ by the MPPT modules to obtain the PV voltage reference signals $v_{PV1}^*$ and $v_{PV2}^*$ in the two channels at 106, the direct-current bus voltage reference signal $v_{bus}^*$ is a maximum value of PV voltage reference signals in the two channels, i.e., $v_{bus}^*=\max(v_{PV1}^*, v_{PV2}^*)$ at 110. At act S23, when $V_{THs} \geq |\Delta v_{PV}| \geq 0$ (N at 104), when the controller DSC enters this mode for the first time, the controller DSC constructs a VLMPP voltage at 112 based on formula V and the collected information of the direct-current bus voltage $v_{bus}$, which comprises the follow two acts: at act S231, when $V_{THb} \geq |v_{bus}-V_{VLMPP}| \geq 0$ (Y at 114), the controller DSC turns off both the boost1 and boost2 controllers, blocks the drive signals PWM1 and PWM2 of the boost1 and boost2 circuits at 116 and maximizes the total input power $P_{PV\_sum}$ of the inverter by the MPPT module based on $v_{bus}$ to obtain the direct-current bus voltage reference signal $v_{bus}^*$ at 118, at which point the PV voltage reference signals $v_{PV1}^*$ and $v_{PV2}^*$ in the two channels will not work. At act S232, when $|v_{bus}-V_{VLMPP}| \geq V_{THb}$ (N at 114), the controller DSC enables both the boost1 and boost2 controllers mandatorily, obtains the drive signals PWM1 and PWM2 of the boost1 and boost2 circuits at 120 and maximizes the PV1 input power $P_{PV1}$ and the PV2 input power $P_{PV2}$ by the MPPT module to obtain the PV voltage reference signals $v_{PV1}^*$ and $v_{PV2}^*$ in the two channels at 122, the direct-current bus voltage reference signal $v_{bus}^*$ is a maximum value of PV voltage reference signals in the two channels, i.e., $v_{bus}^*=\max(v_{PV1}^*, v_{PV2}^*)$ at 124.

$$V_{VLMPP} = \frac{v_{PV1}+v_{PV2}}{2} \qquad \text{V}$$

The disclosure mainly performs logic control on the multi-channel MPPT. In specific implementation, the expected result can only be achieved in conjunction with a boost voltage, current double closed-loop controller, the existing single-channel MPPT controller, etc. At the same time, in order to reduce power sampling and calculation errors, the controller DSC will calculate power using voltage and current sampling averages within 0.2 s; an operational cycle of the MPPT module is 1 s to reduce the phenomenon of misjudgment.

The embodiment described above is merely illustrative of the technical concept and features of the present disclosure and is one example embodiment so as to enable those skilled in the art to understand the content of the present disclosure and practice it accordingly, and is not intended to limit the protection scope of the present disclosure. Any equivalent alteration or modification made in accordance with the spirit of the present disclosure should be included in the protection scope of the present disclosure.

The invention claimed is:

1. A control method for improving conversion efficiency of a multi-channel Maximum Power Point Tracking (MPPT) inverter, comprising:
   collecting an input voltage ($v_{PVm}$) of a photovoltaic panel in each channel, an input current ($i_{PVm}$) of the photovoltaic panel in each channel and a direct-current bus voltage ($v_{bus}$), obtaining an input power ($P_{PVm}$) of the photovoltaic panel in each channel, and using input voltages of at least two channels to obtain a voltage difference ($\Delta v_{PV}$), wherein m=1, 2, . . . , M, and M is a number of input channels of the photovoltaic inverter MPPT;
   comparing the voltage difference ($\Delta v_{PV}$) with a preset on-off control judging threshold to obtain a start state and a stop state of a boost circuit in each channel, a voltage reference signal ($v^*_{PVm}$) in each channel and a direct-current bus voltage reference signal ($v^*_{bus}$) wherein the boost start state and the stop state is determined by:
   when $|\Delta v_{PV}| \geq V_{THb}$, turning off a boost circuit in a channel corresponding to a maximum input voltage ($v_{PV\_max}$), activating the boost circuits in remaining channels, wherein $V_{THb}$ is a first boost on-off control judging threshold, and maximizing the input power ($P_{PVm}$) by an MPPT module in each channel to obtain the voltage reference signal ($v^*_{PVm}$) in each channel, the direct-current bus voltage reference signal ($v^*_{bus}$) using a maximum voltage reference signal ($v^*_{PV\_max}$);
   when $V_{THb} \geq |\Delta v_{PV}| \geq V_{THs}$, activating all boost circuits, wherein $V_{THs}$ is a second boost on-off control judging threshold, wherein $V_{THs}<V_{THb}$; and maximizing the input power ($P_{PVm}$) by the MPPT module in each channel to obtain the voltage reference signal ($v^*_{PVm}$) in each channel, the direct-current bus voltage reference signal ($v^*_{bus}$) using the maximum voltage reference signal ($v^*_{PV\_max}$); and
   when $V_{THs} \geq |\Delta v_{PV}| \geq 0$, obtaining a voltage ($V_{VLMPP}$) at a virtual local maximum power point (VLMPP), turning off all the boost circuits, maximizing a total input power ($P_{PV\_sum}$) of the inverter by an MPPT module based on the direct-current bus voltage ($v_{bus}$) to obtain the direct-current bus voltage reference signal ($v^*_{bus}$), monitoring a voltage difference between the direct-current bus voltage ($v_{bus}$) and the voltage at the virtual local maximum power point ($V_{VLMPP}$), and activating all the boost circuits when the voltage difference between the direct-current bus voltage ($v_{bus}$) and the voltage at the virtual local maximum power point ($V_{VLMPP}$) exceeds the boost on-off control judging threshold ($V_{THb}$).

2. The control method according to claim 1, wherein:
   when collecting the input voltage ($v_{PVm}$) using the maximum input voltage ($v_{PV\_max}$), a photovoltaic (PV) input voltage ($v_{PV\_Smax}$) less than $v_{PV\_max}$ and a minimum PV input voltage ($v_{PV\_min}$) to obtain a voltage difference ($\Delta v_{PV\_max}$) between $v_{PV\_max}$ and $v_{PV\_min}$ and a voltage difference ($\Delta v_{PV\_MS}$) between $v_{PV\_max}$ and $v_{PV\_Smax}$;
   when comparing, comparing the voltage differences $\Delta v_{PV\_max}$ and $\Delta v_{PV\_MS}$ with the preset on-off control judging threshold to obtain the start state and the stop state of the boost circuit in each channel, wherein a boost start and stop control logic is as follows:
   when $|\Delta v_{PV}| \geq V_{THb}$, turning off the boost circuit in the channel corresponding to the maximum input voltage ($v_{PV\_max}$), and activating the boost circuits in the remaining channels;
   when $V_{THb} \geq |\Delta v_{PV}| \geq V_{THs}$, activating all the boost circuits; and
   when $V_{THs} \geq |\Delta v_{PV}| \geq 0$, obtaining the voltage ($V_{VLMPP}$) at the VLMPP, turning off all the boost circuits, monitoring the voltage difference between $v_{bus}$ and $V_{VLMPP}$, and activating all the boost circuits when the voltage difference between $v_{bus}$ and $V_{VLMPP}$ exceeds $V_{THb}$.

3. The control method according to claim 2, wherein obtaining the voltage ($V_{VLMPP}$) further comprises:
   when $V_{THb} \geq |v_{bus}-V_{VLMPP}| \geq 0$, turning off all the boost circuits, and maximizing the total input power ($P_{PV\_sum}$) of the inverter by the MPPT module based on $v_{bus}$ to obtain the direct-current bus voltage reference signal ($v^*_{bus}$); and
   when $V_{THb} \geq v_{bus}-V_{VLMPP} \geq 0$, activating all the boost circuits, and maximizing the input power ($P_{PVm}$) by the MPPT module in each channel to obtain the voltage reference signal ($v^*_{PVm}$) in each channel, the direct-current bus voltage reference signal ($v^*_{bus}$) using the maximum voltage reference signal ($v^*_{PV\_max}$).

4. The control method according to claim 2, wherein the voltage ($V_{VLMPP}$) at the VLMPP is obtained by the following formula:

$$V_{VLMPP} = \frac{\text{SUM}(v_{PV1}, v_{PV2}, \ldots, v_{PVM})}{M}.$$

5. The control method according to claim 1, wherein when collecting the input voltage ($v_{PVm}$), at least using a voltage difference between the maximum input voltage and the minimum input voltage of all input channels.

6. The control method according to claim 1, wherein when collecting the input voltage ($v_{PVm}$), using the maximum input voltage ($v_{PV\_max}$) and $v_{PV\_Smax}$ less than $v_{PV\_max}$ to obtain a voltage difference ($\Delta v_{PV\_MS}$) between $v_{PV\_max}$ and $v_{PV\_Smax}$.

* * * * *